(12) United States Patent
Valente et al.

(10) Patent No.: US 8,961,353 B2
(45) Date of Patent: Feb. 24, 2015

(54) TWO-SPEED DISCONNECTING DRIVELINE WITH ONE REDUCTION GEARSET

(71) Applicant: American Axle & Manufacturing, Inc., Detroit, MI (US)

(72) Inventors: Paul J. Valente, Berkley, MI (US); James P. Downs, South Lyon, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 184 days.

(21) Appl. No.: 13/785,425

(22) Filed: Mar. 5, 2013

(65) Prior Publication Data

US 2013/0303324 A1  Nov. 14, 2013

Related U.S. Application Data

(63) Continuation-in-part of application No. 13/470,941, filed on May 14, 2012, now Pat. No. 8,795,126.

(51) Int. Cl.
*F16H 48/06* (2006.01)
*F16H 37/08* (2006.01)
*B60K 17/35* (2006.01)
*B60K 17/346* (2006.01)

(52) U.S. Cl.
CPC .......... *F16H 37/082* (2013.01); *B60K 17/3467* (2013.01); *B60K 17/3462* (2013.01); *B60K 17/3515* (2013.01)
USPC ............ 475/225; 475/204; 180/249; 180/369

(58) Field of Classification Search
CPC ..... B60K 23/0808; F16H 48/08; F16H 48/22; F16H 48/24; F16H 48/38; F16H 48/42
USPC ........... 475/225, 204, 206; 180/248–250, 369
See application file for complete search history.

(56) References Cited

U.S. PATENT DOCUMENTS

| | | | |
|---|---|---|---|
| 2,783,661 | A | 3/1957 | Dryer |
| 4,407,387 | A | 10/1983 | Lindbert |
| 4,774,857 | A | 10/1988 | Heine et al. |
| 4,915,190 | A | 4/1990 | Iwata |
| 5,105,901 | A | 4/1992 | Watanabe et al. |
| 5,105,902 | A | 4/1992 | Wilson et al. |

(Continued)

FOREIGN PATENT DOCUMENTS

| | | |
|---|---|---|
| KR | 2019990020807 U | 6/1999 |
| KR | 100274035 B1 | 12/2000 |

(Continued)

OTHER PUBLICATIONS

International Search Report and Written Opinion for International Application No. PCT/US2009/053514, dated Mar. 29, 2010.

(Continued)

*Primary Examiner* — Tisha Lewis
(74) *Attorney, Agent, or Firm* — Harness, Dickey & Pierce, P.L.C.

(57) ABSTRACT

A vehicle driveline that includes an input member, a multi-speed transmission, a first differential assembly, a first bevel ring gear and a mode clutch that are disposed axially along a rotational axis of the input member. The multi-speed transmission includes a range collar that is axially movable along the input member axis.

19 Claims, 3 Drawing Sheets

(56) References Cited

U.S. PATENT DOCUMENTS

| | | | |
|---|---|---|---|
| 5,411,110 | A | 5/1995 | Wilson et al. |
| 5,562,566 | A | 10/1996 | Yang |
| 5,599,249 | A | 2/1997 | Zalewski et al. |
| 5,951,428 | A | 9/1999 | Itoh et al. |
| 6,113,512 | A | 9/2000 | Williams |
| 6,186,258 | B1 | 2/2001 | Deutschel et al. |
| 6,263,995 | B1 | 7/2001 | Watson et al. |
| 6,805,653 | B2 | 10/2004 | Krzesicki et al. |
| 6,814,682 | B2 | 11/2004 | Spitale |
| 6,851,501 | B2 | 2/2005 | Gassmann |
| 6,974,400 | B2 | 12/2005 | Williams |
| 7,150,694 | B2 * | 12/2006 | Mizon et al. ............ 475/206 |
| 7,331,896 | B1 | 2/2008 | Kroppe |
| 7,416,505 | B2 | 8/2008 | Downs |
| 7,533,754 | B2 | 5/2009 | Burrows et al. |
| 8,042,642 | B2 | 10/2011 | Marsh et al. |
| 8,047,323 | B2 | 11/2011 | Downs et al. |
| 2002/0088291 | A1 | 7/2002 | Bowen |
| 2005/0023063 | A1 | 2/2005 | Mueller |
| 2006/0283654 | A1 | 12/2006 | Krisher |
| 2008/0227582 | A1 | 9/2008 | Peura |
| 2010/0216593 | A1 * | 8/2010 | Ekonen et al. ............ 475/295 |
| 2011/0275470 | A1 * | 11/2011 | Ekonen et al. ............ 475/198 |
| 2011/0319213 | A1 * | 12/2011 | Ekonen et al. ............ 475/86 |
| 2012/0029779 | A1 | 2/2012 | Dickinson et al. |
| 2012/0073929 | A1 | 3/2012 | Grutter et al. |
| 2012/0083380 | A1 | 4/2012 | Reed et al. |
| 2014/0213406 | A1 * | 7/2014 | Downs et al. ............ 475/220 |

FOREIGN PATENT DOCUMENTS

| | | |
|---|---|---|
| KR | 100291087 B1 | 3/2001 |
| KR | 100483163 B1 | 4/2005 |
| WO | WO-2010104853 A2 | 9/2010 |

OTHER PUBLICATIONS

International Preliminary Report on Patentability (Chapter I of the Patent Cooperation Treaty) for PCT/US2009/053514, issued Feb. 15, 2011.

International Search Report and Written Opinion for International Application No. PCT/US2010/041767, dated Feb. 28, 2011.

* cited by examiner

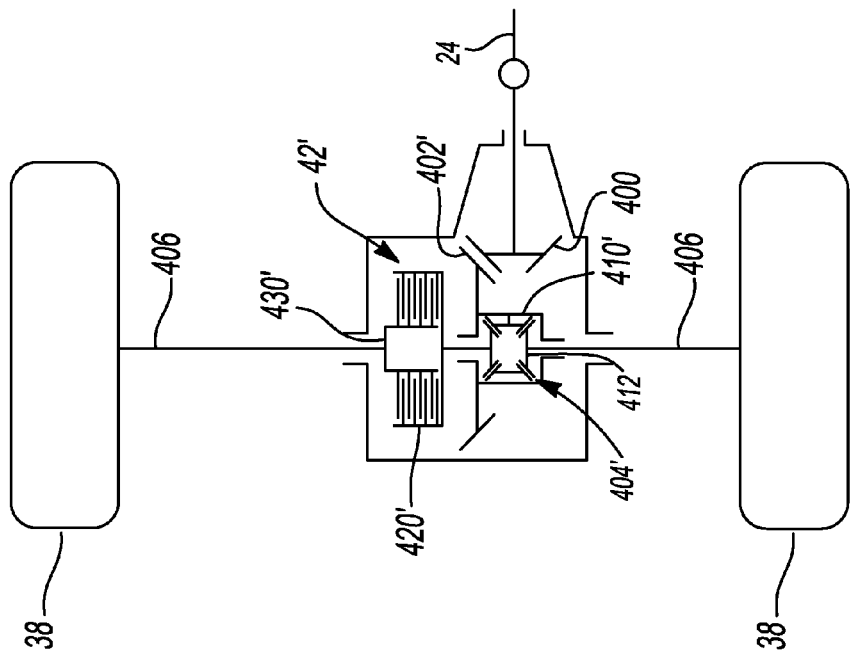
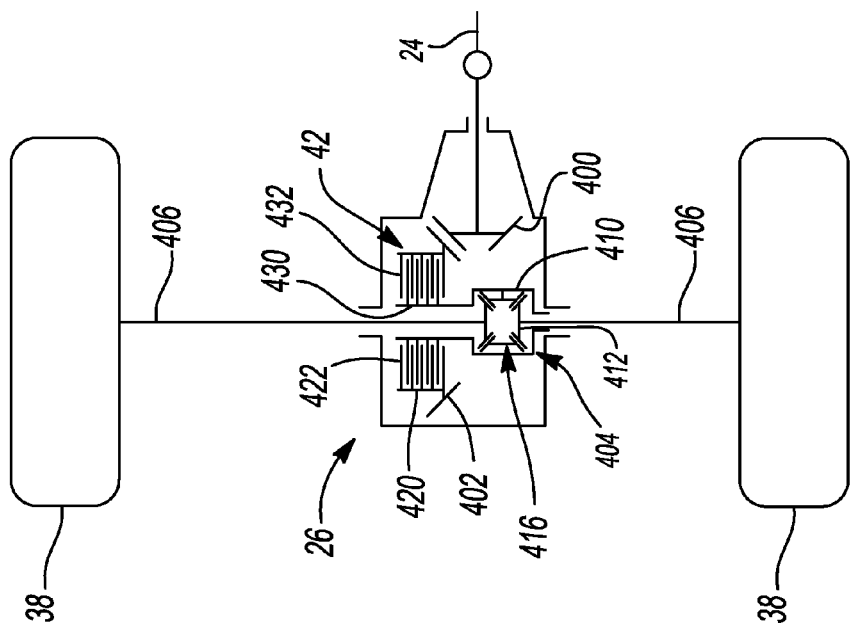

US 8,961,353 B2

TWO-SPEED DISCONNECTING DRIVELINE WITH ONE REDUCTION GEARSET

CROSS-REFERENCE TO RELATED APPLICATIONS

This application is a continuation-in-part of U.S. patent application Ser. No. 13/470,941 filed May 14, 2012 and entitled "Disconnectable Driveline For All-Wheel Drive Vehicle". The disclosure of the aforementioned patent application is incorporated by reference as if fully set forth in detail herein.

FIELD

The present disclosure relates to a two-speed disconnecting driveline with one reduction gearset.

BACKGROUND

This section provides background information related to the present disclosure which is not necessarily prior art.

Many modern automotive vehicles, such as crossover vehicles, are available with an all-wheel drive (AWD) drivetrain that is based on a front-wheel drive (FWD) architecture. This optional drivetrain arrangement permits drive torque to be selectively and/or automatically transferred from the powertrain to both the primary (i.e., front) driveline and the secondary (i.e., rear) driveline to provide better traction when the vehicle is operated in inclement weather and on off-highway road conditions. Such AWD vehicles necessarily are equipped with a much more complex drivetrain which, in addition to the primary driveline, must include the additional components associated with the secondary driveline such as a power take-off unit and a propshaft.

In an effort to minimize driveline losses (i.e., viscous drag, friction, inertia and oil churning) associated with secondary driveline being back-driven when no drive torque is transmitted thereto, it is known to incorporate a disconnect system that is configured to uncouple components of the secondary driveline such as, for example, the rear wheels or the rear differential from the remainder of the secondary driveline. To this end, there remains a need in the art for development of improved disconnectable drivelines for use in AWD vehicles.

SUMMARY

This section provides a general summary of the disclosure, and is not a comprehensive disclosure of its full scope or all of its features.

In one form, the present teachings provide a vehicle driveline that includes a housing, an input member, a multi-speed transmission, a first differential assembly, a pair of first shafts, a first bevel ring gear, and a mode clutch. The input member is received in the housing and is rotatable about an input member axis. The multi-speed driveline transmission is disposed in the housing and includes an input shaft, a sun gear, a plurality of planet gears, a planet carrier, a ring gear and a range collar. The sun gear is mounted on the input shaft for rotation therewith. The planet gears are meshingly engaged with the sun gear and the ring gear. The planet carrier has a carrier body and a plurality of pins that are fixed to the carrier body for rotation therewith. Each of the pins journally supports an associated one of the planet gears. The ring gear is non-rotatably coupled to the housing. The range collar is concentric with the input member and the input shaft and is movable along the input member axis between a first range position, a second range position and a third range position. The range collar rotatably couples the input member to the input shaft when the range collar is in the first range position. Rotary power is not transmitted through the range collar when the range collar is disposed in the second range position. The range collar rotatably couples the input member to the carrier body when the range collar is in the third range position. The first differential assembly has a differential case and a differential gearset with a pair of first output members. The differential case is coupled to the carrier body for rotation therewith. The differential gearset is received in the differential case. The first shafts are coupled to a corresponding one of the first output members for rotation therewith. The first bevel ring gear is mounted in the housing concentrically about at least one of the differential case and the carrier body. The mode clutch selectively rotatably couples the first bevel ring gear to the differential case. The multi-speed transmission, the first bevel ring gear, the mode clutch and the first differential assembly are disposed along the input member axis such that the carrier body is disposed axially between the first bevel ring gear and the range sleeve and the mode clutch is disposed axially between the carrier body and the differential case.

In another form, the present teachings provide a vehicle driveline that includes a housing, an input member, a multi-speed transmission, a first differential assembly, a pair of first shafts, a first gear, and a mode clutch. The input member is received in the housing and is rotatable about an input member axis. The multi-speed driveline transmission is disposed in the housing and includes an input shaft, a sun gear, a plurality of planet gears, a planet carrier, a ring gear and a range collar. The sun gear is mounted on the input shaft for rotation therewith. The planet gears are meshingly engaged with the sun gear and the ring gear. The planet carrier has a carrier body and a plurality of pins that are fixed to the carrier body for rotation therewith. Each of the pins journally supports an associated one of the planet gears. The ring gear is non-rotatably coupled to the housing. The range collar is concentric with the input member and the input shaft and is movable along the input member axis between a first range position, a second range position and a third range position. The range collar rotatably couples the input member to the input shaft when the range collar is in the first range position. Rotary power is not transmitted through the range collar when the range collar is disposed in the second range position. The range collar rotatably couples the input member to the carrier body when the range collar is in the third range position. The first differential assembly has a differential case and a differential gearset with a pair of first output members. The differential case is coupled to the carrier body for rotation therewith. The differential gearset is received in the differential case. The first shafts are coupled to a corresponding one of the first output members for rotation therewith. The first gear is mounted in the housing concentrically about at least one of the differential case and the carrier body. The mode clutch is mounted in the housing axially between the carrier body and the differential case. The mode clutch selectively rotatably couples the first gear to the differential case.

In still another form, the present teachings provide a vehicle driveline that includes a housing, an input member, a multi-speed transmission, a first differential assembly, a pair of first shafts, a first bevel ring gear, and a mode clutch. The input member is received in the housing and is rotatable about an input member axis. The multi-speed driveline transmission is disposed in the housing and includes an input shaft, a sun gear, a plurality of planet gears, a planet carrier, a ring gear and a range collar. The sun gear is mounted on the input shaft for rotation therewith. The planet gears are meshingly engaged with the sun gear and the ring gear. The planet carrier has a carrier body and a plurality of pins that are fixed to the carrier body for rotation therewith. Each of the pins journally supports an associated one of the planet gears. The ring gear is non-rotatably coupled to the housing. The range collar is concentric with the input member and the input shaft and is movable along the input member axis between a first range position, a second range position and a third range position. The range collar rotatably couples the input member to the input shaft when the range collar is in the first range position. Rotary power is not transmitted through the range collar when the range collar is disposed in the second range position. The range collar rotatably couples the input member to the carrier body when the range collar is in the third range position. The first differential assembly has a differential case and a differential gearset with a pair of first output members. The differential case is coupled to the carrier body for rotation therewith. The differential gearset is received in the differential case. The first shafts are coupled to a corresponding one of the first output members for rotation therewith. The first bevel ring gear is mounted in the housing concentrically about at least one of the differential case and the carrier body. The mode clutch is mounted in the housing and includes a clutch input member and a clutch output member. The clutch input member is coupled to the carrier body for rotation therewith. The clutch output member is non-rotatably coupled to the first bevel ring gear. The mode clutch is operable for selectively transmitting rotary power between the clutch input member and the clutch output member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is an enlarged portion of FIG. 1 illustrating a rear portion of the vehicle driveline in more detail; and FIG. 4 is a view similar to that of FIG. 3 but depicting an alternately constructed rear axle assembly.

Corresponding reference numerals indicate corresponding parts throughout the several views of the drawings.

DETAILED DESCRIPTION

Figure 1:
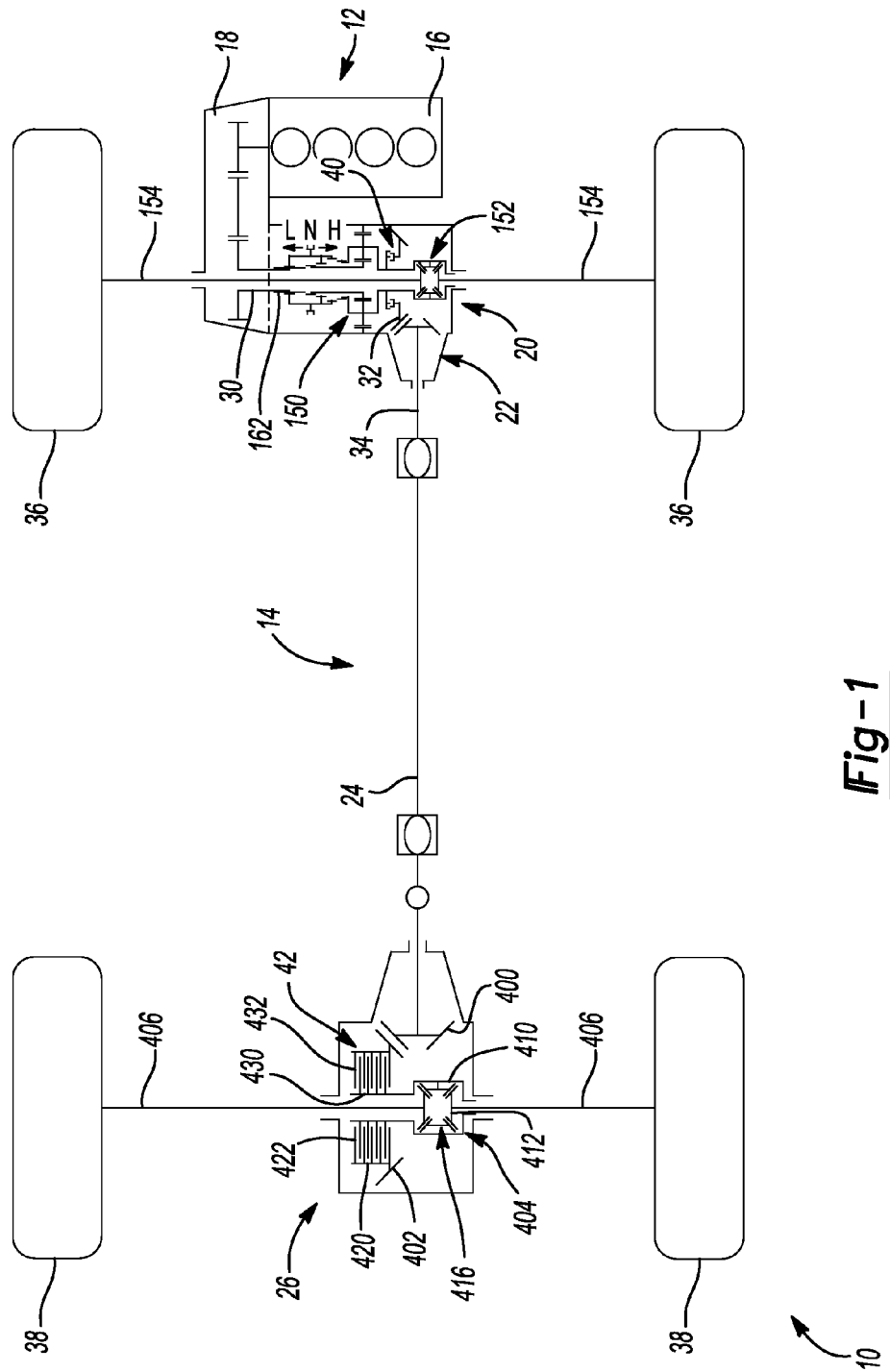
FIG. 1 is a schematic illustration of an exemplary vehicle having a vehicle driveline constructed in accordance with the teachings of the present disclosure.

With reference to FIG. 1 of the drawings, an exemplary vehicle having a power transmitting component constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output propulsive power to the drive train 14. The transmission 18 can have a plurality of automatically or manually-selected gear ratios. The drive train 14 in the particular example provided is of an all-wheel drive configuration, but those of skill in the art will appreciate that the teachings of the present disclosure are applicable to other drive train configurations, including four-wheel drive configurations, rear-wheel drive configurations, and front-wheel drive configurations.

The drive train 14 can include a front axle assembly 20, a power take-off unit (PTU) 22, a prop shaft 24 and a rear axle assembly 26. An output of the transmission 18 can be coupled to an input of the front axle assembly 20 to drive an input member 30 of the front axle assembly 20. The PTU 22 can have a PTU input member 32, which can receive rotary power from the input member 30 of the front axle assembly 20, and a PTU output member 34 that can transmit rotary power to the prop shaft 24. The prop shaft 24 can couple the PTU output member 34 to the rear axle assembly 26 such that rotary power output by the PTU 22 is received by the rear axle assembly 26. The front axle assembly 20 and the rear axle assembly 26 could be driven on a full-time basis to drive front and rear vehicle wheels 36 and 38, respectively. It will be appreciated, however, that the drive train 14 could include one or more clutches to interrupt the transmission of rotary power through a part of the drive train 14. In the particular example provided, the drive train 14 include a first clutch 40, which can be configured to interrupt the transmission of rotary power into or through the PTU 22, and a second clutch 42, which can be configured to halt rotation of components within the rear axle assembly 26.

Figure 2:
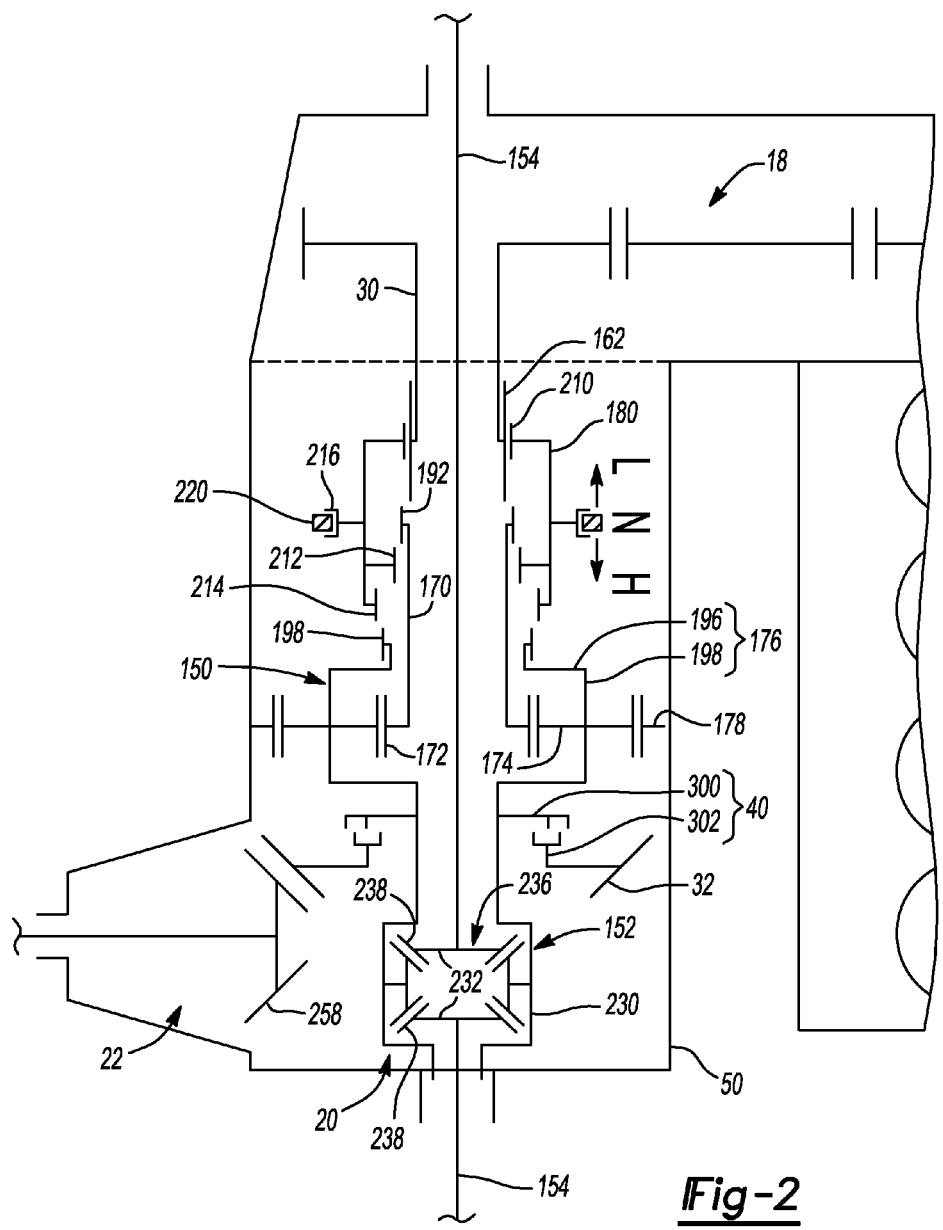
FIG. 2 is an enlarged portion of FIG. 1 illustrating a front portion of the vehicle driveline in more detail.

With reference to FIG. 2, the front axle assembly 20, the PTU 22 and the first clutch 40 are illustrated in more detail. The front axle assembly 20, the PTU 22 and the first clutch 40 can be mounted in a housing assembly 50.

The front axle assembly 20 can include the input member 30, a two-speed transmission 150, a front differential assembly 152 and a pair of front axle shafts 154. The input member 30 can be a hollow shaft that can be configured to engage with the output member of the transmission 18. The input member 30 can have a set of first (external) range teeth 162 formed on an end opposite the output member of the transmission 18. The two-speed transmission 150 can include an input shaft 170, a sun gear 172, a plurality of planet gears 174, a planet carrier 176, a ring gear 178 and a range collar 180. The input shaft 170 can be a hollow structure that can be co-axial with the input member 30. The input shaft 170 can have a set of second (external) range teeth 192 formed on an end adjacent to the input member 30. The sun gear 172 can be mounted on an end of the input shaft 170 opposite the second (external) range teeth 192 and can be coupled to the input shaft 170 for rotation therewith. The planet gears 174 can be meshingly engaged with the sun gear 172 and the ring gear 178. The planet carrier 176 can include a carrier body 196 and a plurality of pins 198 that can be fixedly coupled to the carrier body 196 for rotation therewith. Each of the planet gears 174 can be received onto and journally supported by a corresponding one of the pins 198. The carrier body 196 can have a set of third (external) range teeth 198. The ring gear 178 can be meshingly engaged to the planet gears 174 and can be non-rotatably coupled to the housing assembly 50. The range collar 180 can be a tubular sleeve that can be mounted on the input shaft 170. The range collar 180 can include fourth, fifth and sixth sets of (internal) range teeth 210, 212 and 214, respectively, that can be axially separated from one another, and a collar member 216. The fourth set of (internal) range teeth 210 can be slideably engaged to the first set of (external) range teeth 162 on the input member 30 so that the range collar 180 is coupled to the input member 30 for rotation therewith. The collar member 216 of the range collar 180 can be engaged to an actuator to permit the range collar 180 to be moved axially between first, second and third range positions. Any type of actuator (not specifically shown) can be employed, such as an axially movable fork 220 that is configured to engage the collar member 216.

In the first range position, the fifth set of (internal) range teeth 212 is coupled to the second set of (external) range teeth 192 on the input shaft 170 and the sixth set of (internal) range teeth 214 is decoupled from the set of third (external) range teeth 198 on the carrier body 196 to thereby provide a "low-speed condition" in which the two-speed transmission 150 operates in a second or low-speed gear reduction.

In the second range position, the fifth set of (internal) range teeth 212 is decoupled from the second set of (external) range teeth 192 on the input shaft 170 and the sixth set of (internal) range teeth 214 is decoupled from the set of third (external) range teeth 198 on the carrier body 196 to thereby provide a "neutral condition" in which rotary power is not transmitted through the two-speed transmission 150, the front differential assembly 152 or the PTU 22.

In the third range position, the fifth set of (internal) range teeth 212 is decoupled from the second set of (external) range teeth 192 on the input shaft 170 and the sixth set of (internal) range teeth 214 is coupled to the set of third (external) range teeth 198 on the carrier body 196 to thereby provide a "high-speed condition" in which the two-speed transmission 150 operates in a first or high-speed gear reduction.

The front differential assembly 152 can include a differential case 230, a pair of output members 232 and a means for permitting speed differentiation between the output members 232. The differential case 230 can be coupled to the carrier body 196 for rotation therewith such that the differential case 230 is rotatable about a rotational axis of the input member 30. The differential case 230 can house the output members 232 and the speed differentiation means. In the example provided, the speed differentiation means comprises an open differential gearset 236 that has a pair of side gears 238 and the output members 232 can comprise portions (e.g., an internally-splined bore) of the side gears 238 to which the front axle shafts 154 are non-rotatably coupled. It will be appreciated, however that other speed differentiation means could be employed in the alternative, such as one or more clutches, a locking differential or a limited slip differential. Moreover, while the differential gearset 236 is illustrated as having bevel pinions and sidegears, it will be appreciated that the pinions and sidegears could have a parallel-axis configuration in which the pinions and side gears have spur or helical gear teeth.

The front axle shafts 154 can have a male-splined segment that can be non-rotatably coupled to the output members 232 such that the front axle shafts 154 are rotatably driven by the output members 232. One of the front axle shafts 154 can be received through the input shaft 170 and the input member 30.

The PTU 22 can include the PTU input member 32, a pinion gear 258 and the PTU output member 34. The PTU input member 32 can comprise a bevel ring gear that is mounted in the housing assembly concentrically about at least one of the differential case 230 and the carrier body 196. The pinion gear 258 can be meshingly engaged to the bevel ring gear of the PTU input member 32 and can be aligned along an axis that is generally perpendicular to the rotational axis of the input member 30. If desired, the pinion gear 258 can be a hypoid pinion gear. The PTU output member 34 can be coupled to the pinion gear 258 for rotation therewith.

The first or mode clutch 40 can be any type of clutch, including a friction clutch or a synchronizer. In the particular example provided, the mode clutch 40 is a dog clutch having a clutch input member 300 and a clutch output member 302. The clutch input member 300 can be coupled to the carrier body 196 for rotation therewith. The clutch output member 302 can be non-rotatably coupled to the bevel ring gear of the PTU input member 32. The mode clutch 40 can be operable for selectively transmitting rotary power between the clutch input member 300 and the clutch output member 302.

With reference to FIG. 3, the rear axle assembly 26 can include an input pinion 400, a bevel ring gear 402, a second differential assembly 404, a pair of second shafts 406, and the second (axle disconnect) clutch 42. The input pinion 400 can be coupled to an end of the propshaft 24 for rotation therewith. The second bevel ring gear 402 being meshed with the input pinion 400. The second differential assembly 404 can be configured to receive rotary power transmitted through the second bevel ring gear 402 and can have a differential case 410, a pair of second output members 412 and a means for permitting speed differentiation between the second output members 412. In the example provided, the speed differentiation means comprises an open differential gearset 416 in which the second output members 412 are side gears. Each of the second shafts 406 can be coupled to a corresponding one of the second output members 412 for rotation therewith. The axle disconnect clutch 42 can be configured to selectively interrupt power transmission through the second differential assembly 404. The axle disconnect clutch 42 can be any type of clutch and can be mounted coaxially with the second differential assembly 404. In the particular example provided, the axle disconnect clutch 42 includes a clutch input member 420 that is coupled to the bevel ring gear 402 for rotation therewith, a plurality of first friction plates 422 that are non-rotatably coupled to the clutch input member 420, a clutch output member 430, which is non-rotatably coupled to the differential case 410, a plurality of second friction plates 432, which are non-rotatably coupled to the clutch output member 430, and an actuator (not specifically shown). The first and second friction plates 422 and 432 can be interleaved and the actuator can be employed to compress the first and second friction plates 422 and 432 so that they frictionally engage one another so that rotary power can be transmitted from the bevel ring gear 402 through the axle disconnect clutch 42 and to the differential case 410. When the actuator is disengaged so that rotary power is not transmitted through the axle disconnect clutch 42, the rear wheels 38 will drive the second output members 412, but the axle disconnect clutch 42 inhibits the transmission of rotary power into the bevel ring gear 412 that would cause the bevel ring gear 412 to correspondingly rotate. In this way, operation of the vehicle 10 (FIG. 1) in a front-wheel drive mode will not permit the rear wheels 36 to "back drive" the bevel ring gear 402.

An alternately constructed rear axle assembly 26' is shown in FIG. 4. In this example, the bevel ring gear 402' is coupled directly to the differential case 410' of the differential assembly 404', the clutch input member 420' of the axle disconnect clutch 42' is coupled for rotation with one of the second output members 412, and the clutch output member 430' is rotatably coupled to one of the second shafts 406. The axle disconnect clutch 42' can be selectively disengaged (so as not to transmit rotary power therethrough) so that operation of the vehicle 10 (FIG. 1) in a front-wheel drive mode will not permit the rear wheels 36 to "back drive" the bevel ring gear 402'.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline comprising:
   a housing;
   an input member received in the housing and being rotatable about an input member axis, the input member being adapted to receive rotary power from a vehicle transmission;
   a multi-speed driveline transmission disposed in the housing, the multi-speed driveline transmission comprising an input shaft, a sun gear, a plurality of planet gears, a planet carrier, a ring gear and a range collar, the sun gear being mounted on the input shaft for rotation therewith, the planet gears meshingly engaged with the sun gear and the ring gear, a planet carrier having a carrier body and a plurality of pins that are fixed to the carrier body for rotation therewith, each of the pins journally supporting an associated one of the planet gears, the ring gear being non-rotatably coupled to the housing, the range collar being concentric with the input member and the input shaft and being movable along the input member axis between a first range position, a second range position and a third range position, wherein the range collar rotatably couples the input member to the input shaft when the range collar is in the first range position, wherein rotary power is not transmitted through the range collar when the range collar is disposed in the second range position, and wherein the range collar rotatably couples the input member to the carrier body when the range collar is in the third range position;
   a first differential assembly having a differential case and a differential gearset having a pair of first output members, the differential case being coupled to the carrier body for rotation therewith, the differential gearset being received in the differential case;
   a pair of first shafts, each of the first shafts coupled to a corresponding one of the first output members for rotation therewith;
   a first bevel ring gear mounted in the housing concentrically about at least one of the differential case and the carrier body; and
   a mode clutch mounted in the housing, the mode clutch having a clutch input member and a clutch output member, the clutch input member being coupled to the carrier body for rotation therewith, the clutch output member being non-rotatably coupled to the first bevel ring gear, the mode clutch being operable for selectively transmitting rotary power between the clutch input member and the clutch output member.

2. The vehicle driveline of claim 1, further comprising:
   a bevel pinion gear mounted in the housing and meshingly engaged to the first bevel ring gear;
   a propshaft having a first end coupled for rotation with the bevel pinion gear;
   an axle assembly having an input pinion, a second bevel ring gear, a second differential assembly, a pair of second shafts, and an axle disconnect clutch, the input pinion being coupled to a second end of the propshaft for rotation therewith, the second bevel ring gear being meshed with the input pinion, the second differential assembly being configured to receive rotary power transmitted through the second bevel ring gear and having a pair of second output members, each of the second shafts coupled to a corresponding one of the second output members for rotation therewith, the axle disconnect clutch being configured to selectively interrupt power transmission through the second differential assembly.

3. The vehicle driveline of claim 2, wherein the axle disconnect clutch is mounted coaxially with the second differential assembly.

4. The vehicle driveline of claim 3, wherein the second bevel ring gear is non-rotatably coupled to an input member of the axle disconnect clutch.

5. The vehicle driveline of claim 3, wherein an input member of the axle disconnect clutch is non-rotatably coupled to one of the second output members.

6. The vehicle driveline of claim 1, further comprising a clutch fork coupled to the range collar.

7. A vehicle driveline comprising:
   a housing;
   an input member received in the housing and being rotatable about an input member axis, the input member being adapted to receive rotary power from a vehicle transmission;
   a multi-speed driveline transmission disposed in the housing, the multi-speed driveline transmission comprising an input shaft, a sun gear, a plurality of planet gears, a planet carrier, a ring gear and a range collar, the sun gear being mounted on the input shaft for rotation therewith, the planet gears meshingly engaged with the sun gear and the ring gear, a planet carrier having a carrier body and a plurality of pins that are fixed to the carrier body for rotation therewith, each of the pins journally supporting an associated one of the planet gears, the ring gear being non-rotatably coupled to the housing, the range collar being concentric with the input member and the input shaft and being movable along the input member axis between a first range position, a second range position and a third range position, wherein the range collar rotatably couples the input member to the input shaft when the range collar is in the first range position, wherein rotary power is not transmitted through the range collar when the range collar is disposed in the second range position, and wherein the range collar rotatably couples the input member to the carrier body when the range collar is in the third range position;
   a first differential assembly having a differential case and a differential gearset having a pair of first output members, the differential case being coupled to the carrier body for rotation therewith, the differential gearset being received in the differential case;
   a pair of first shafts, each of the first shafts coupled to a corresponding one of the first output members for rotation therewith;
   a first gear mounted in the housing concentrically about at least one of the differential case and the carrier body; and
   a mode clutch mounted in the housing axially between the carrier body and the differential case, the mode clutch being selectively operable for rotatably coupling the first gear to the differential case.

8. The vehicle driveline of claim 7, wherein the first gear is a bevel ring gear.

9. The vehicle driveline of claim 8, further comprising:
   a bevel pinion gear mounted in the housing and meshingly engaged to the first bevel ring gear;

a propshaft having a first end coupled for rotation with the bevel pinion gear;

an axle assembly having an input pinion, a second bevel ring gear, a second differential assembly, a pair of second shafts, and an axle disconnect clutch, the input pinion being coupled to a second end of the propshaft for rotation therewith, the second bevel ring gear being meshed with the input pinion, the second differential assembly being configured to receive rotary power transmitted through the second bevel ring gear and having a pair of second output members, each of the second shafts coupled to a corresponding one of the second output members for rotation therewith, the axle disconnect clutch being configured to selectively interrupt power transmission through the second differential assembly.

10. The vehicle driveline of claim 9, wherein the axle disconnect clutch is mounted coaxially with the second differential assembly.

11. The vehicle driveline of claim 10, wherein the second bevel ring gear is non-rotatably coupled to an input member of the axle disconnect clutch.

12. The vehicle driveline of claim 10, wherein an input member of the axle disconnect clutch is non-rotatably coupled to one of the second output members.

13. The vehicle driveline of claim 7, further comprising a clutch fork coupled to the range collar.

14. A vehicle driveline comprising:

a housing;

an input member received in the housing and being rotatable about an input member axis, the input member being adapted to receive rotary power from a vehicle transmission;

a multi-speed driveline transmission disposed in the housing, the multi-speed driveline transmission comprising an input shaft, a sun gear, a plurality of planet gears, a planet carrier, a ring gear and a range collar, the sun gear being mounted on the input shaft for rotation therewith, the planet gears meshingly engaged with the sun gear and the ring gear, a planet carrier having a carrier body and a plurality of pins that are fixed to the carrier body for rotation therewith, each of the pins journally supporting an associated one of the planet gears, the ring gear being non-rotatably coupled to the housing, the range collar being concentric with the input member and the input shaft and being movable along the input member axis between a first range position, a second range position and a third range position, wherein the range collar rotatably couples the input member to the input shaft when the range collar is in the first range position, wherein rotary power is not transmitted through the range collar when the range collar is disposed in the second range position, and wherein the range collar rotatably couples the input member to the carrier body when the range collar is in the third range position;

a first differential assembly having a differential case and a differential gearset having a pair of first output members, the differential case being coupled to the carrier body for rotation therewith, the differential gearset being received in the differential case;

a pair of first shafts, each of the first shafts coupled to a corresponding one of the first output members for rotation therewith;

a first bevel ring gear mounted in the housing concentrically about at least one of the differential case and the carrier body; and a mode clutch for selectively rotatably coupling the first bevel ring gear to the differential case;

wherein the multi-speed transmission, the first bevel ring gear, the mode clutch and the first differential assembly are disposed along the input member axis such that the carrier body is disposed axially between the first bevel ring gear and the range sleeve and the mode clutch is disposed axially between the carrier body and the differential case.

15. The vehicle driveline of claim 14, further comprising:

a bevel pinion gear mounted in the housing and meshingly engaged to the first bevel ring gear;

a propshaft having a first end coupled for rotation with the bevel pinion gear;

an axle assembly having an input pinion, a second bevel ring gear, a second differential assembly, a pair of second shafts, and an axle disconnect clutch, the input pinion being coupled to a second end of the propshaft for rotation therewith, the second bevel ring gear being meshed with the input pinion, the second differential assembly being configured to receive rotary power transmitted through the second bevel ring gear and having a pair of second output members, each of the second shafts coupled to a corresponding one of the second output members for rotation therewith, the axle disconnect clutch being configured to selectively interrupt power transmission through the second differential assembly.

16. The vehicle driveline of claim 15, wherein the axle disconnect clutch is mounted coaxially with the second differential assembly.

17. The vehicle driveline of claim 16, wherein the second bevel ring gear is non-rotatably coupled to an input member of the axle disconnect clutch.

18. The vehicle driveline of claim 16, wherein an input member of the axle disconnect clutch is non-rotatably coupled to one of the second output members.

19. The vehicle driveline of claim 14, further comprising a clutch fork coupled to the range collar.

* * * * *